(No Model.)
A. A. STROM.
TIE ROD FOR SWITCH RAILS.
No. 395,930. Patented Jan. 8, 1889.
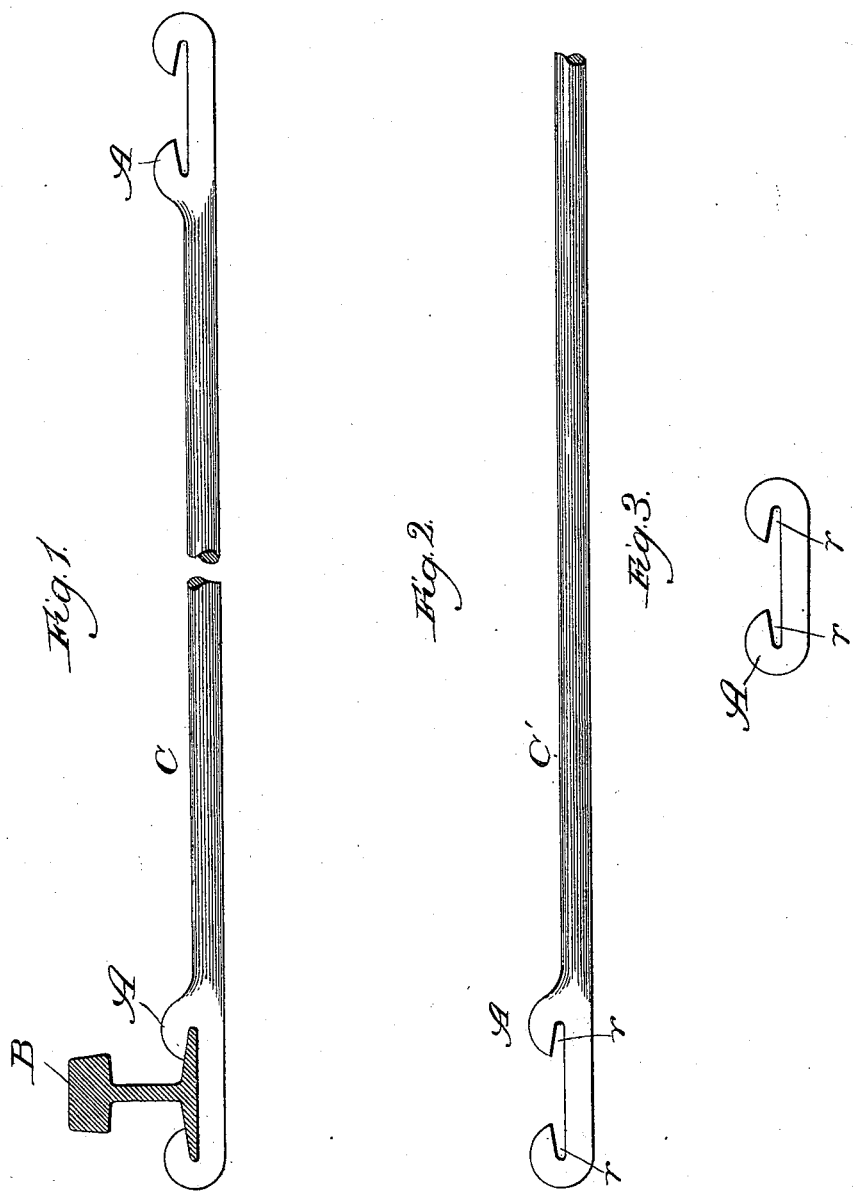
Witnesses:
Geo. Gaylord.
M. J. Bowers.
Inventor.
Axel A. Strom,
By Dyrenforth & Dyrenforth
Attys.

UNITED STATES PATENT OFFICE.

AXEL A. STROM, OF AUSTIN, ILLINOIS.

TIE-ROD FOR SWITCH-RAILS.

SPECIFICATION forming part of Letters Patent No. 395,930, dated January 8, 1889.

Application filed August 21, 1888. Serial No. 283,317. (No model.)

*To all whom it may concern:*

Be it known that I, AXEL A. STROM, a citizen of the United States, residing at Austin, in the county of Cook and State of Illinois, have invented a new and useful Method of Manufacturing Connecting-Rods and Tie-Bars for Switch-Rails, of which the following is a specification.

My invention relates to a new manner of construction of the rod for connecting a rail, especially of a stub-switch, with the switch-stand, or for connecting the two switch-rails together.

It is common to employ tie-bars at intervals along a stub-switch to connect the rails rigidly together, and thus cause the movement of one to move with it the other, the movement being accomplished from a switch-stand through a rod commonly termed the "connecting-rod," which connects the spindle of the switch-stand with the adjacent rail of the switch. A form of connecting medium of the connecting-rod hitherto in quite common use comprises a bar or rod having toward one end a clamp to hold the rail around its base or flanges and abut at its extremities against opposite sides of the web, and where the device constitutes a tie-bar such a clamp is provided at each end of the rod or bar to receive the bases of both switch-rails. The clamp is formed by bending the end of the rod or bar to be provided with it into a hook, and welding or otherwise securing upon the rod or bar a tongue or "clip" to form a counterpart of the hook, thereby causing the hook and clip together to form the socket or clamp to receive and hold a rail in the manner described.

A connecting-rod or tie-bar thus constructed is objectionable by reason of the fact that the manner of providing the counterpart of the hooked extremity of the rod or clip—namely, by welding or riveting it upon the bar—renders it weak, and thus liable to be broken off with use.

The object of my invention is to afford an improved method of constructing this form of device by forming the clamp device, whether provided with a clamp at one or both ends of the rod or bar, by bending toward each other the opposite ends of a continuous piece of metal, whereby the grain of the metal forming the clamp is continuous, and welding together the clamp thus formed and an end of the rod or bar.

In the accompanying drawings, Figure 1 shows a tie-bar with a clamp formed by my improved method at each end, the rod (having a section broken out to permit both ends to be illustrated on the sheet) thereby constituting the device a tie-bar. Fig. 2 shows the clamp on one end only of a broken section of bar, the device thus forming a connecting-rod; and Fig. 3 shows the blank-clamp.

A is a clamp comprising a section of bar metal having its ends bent toward each other to afford a socket, *r*, shaped like, or substantially like, the base or flange portion of a rail, B.

If a tie-rod, C, is to be formed, the rod portion is welded to a clamp A at each of its ends, whereby each clamp receives one of a pair of switch-rails, and thus holds them apart and connects them, while if a connecting-bar, C', is to be formed one end only of the bar portion is welded to a clamp A, the opposite end being adapted for connection with the form of switch-stand with which it is intended to be used.

The method of construction thus described avoids a weak part in the clamp, and thus provides a better device than that upon which it is designed, as aforesaid, to afford an improvement.

The manner of adjustment of the clamp upon a rail is the same as commonly practiced—namely, the clamp is placed over the rail from an end of the latter into desired position thereon.

What I claim as new, and desire to secure by Letters Patent, is—

The method of manufacturing a connecting-rod or tie-bar, which consists in bending toward each other the opposite ends of a bar or bars of metal, thereby forming each bar into a clamp, A, and welding to one or each end of a bar one of said clamps, substantially as described.

AXEL A. STROM.

In presence of—
CHAS. JOHNSON,
J. W. DYRENFORTH.